(12) United States Patent
Yoshida et al.

(10) Patent No.: US 7,495,724 B2
(45) Date of Patent: Feb. 24, 2009

(54) LIQUID CRYSTAL DISPLAY DEVICE

(75) Inventors: Norihiro Yoshida, Kumagaya (JP); Jin Hirosawa, Saitama (JP); Arihiro Takeda, Sagamihara (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 161 days.

(21) Appl. No.: 11/668,238

(22) Filed: Jan. 29, 2007

(65) Prior Publication Data

US 2007/0182893 A1      Aug. 9, 2007

(30) Foreign Application Priority Data

Feb. 3, 2006      (JP)      ............... 2006-027542

(51) Int. Cl.
*G02F 1/1335*      (2006.01)
(52) U.S. Cl. ...................................... 349/113
(58) Field of Classification Search .................. 349/113
See application file for complete search history.

(56) References Cited

U.S. PATENT DOCUMENTS 7,289,187 B2 *  10/2007  Choo ......................... 349/187
2007/0182893 A1     8/2007  Yoshida et al.

FOREIGN PATENT DOCUMENTS

JP      2001-264750      9/2001

OTHER PUBLICATIONS

U.S. Appl. No. 12/028,526, filed Feb. 8, 2008, Yoshida, et al.
U.S. Appl. No. 11/621,265, filed Jan. 9, 2007, Yasushi Kawata, et al.
U.S. Appl. No. 11/457,334, filed Jul. 13, 2006, Yoshitaka Yamada, et al.
U.S. Appl. No. 11/503,960, filed Aug. 15, 2006, Yasushi Kawata, et al.
U.S. Appl. No. 11/461,197, filed Jul. 31, 2006, Norihiro Yoshida, et al.
U.S. Appl. No. 11/466,230, filed Aug. 22, 2006, Takeshi Yamaguchi, et al.
U.S. Appl. No. 11/668,238, filed Jan. 29, 2007, Yoshida, et al.
U.S. Appl. No. 11/673,168, filed Feb. 9, 2007, Hirosawa, et al.
U.S. Appl. No. 11/956,948, filed Dec. 14, 2007, Tago, et al.

* cited by examiner

*Primary Examiner*—David Nelms
*Assistant Examiner*—Phu Vu
(74) *Attorney, Agent, or Firm*—Oblon, Spivak, McClelland, Maier & Neustadt, P.C.

(57) ABSTRACT

In order to achieve high display quality level in both of the reflective and transmissive regions without providing steps in the liquid crystal layer, in the reflective region for display with light reflected from a metallic auxiliary capacitance line, a part of a transparent pixel electrode overlaps the auxiliary capacitance line. An electric field generated between the pixel electrode and the counter electrode inclines liquid crystal molecules in the liquid crystal layer in a region where the pixel electrode overlaps the auxiliary capacitance line, and an oblique electric field generated between an end portion of the pixel electrode and the counter electrode inclines liquid crystal molecules in the liquid crystal layer in a region where the pixel electrode does not overlap the auxiliary capacitance line. Thereby, the phase differences in light passing through the reflective region is close to that in light passing through the transmissive region.

9 Claims, 9 Drawing Sheets

|  | FIRST EMBODIMENT | SECOND EMBODIMENT | THIRD EMBODIMENT |
|---|---|---|---|
| TRANSMISSION DISPLAY | ○ | ○ | ○ |
| REFLECTION DISPLAY | ○ | ◎ | ○ |
| CHARACTERISTICS | HIGH LUMINANCE | HIGH LUMINANCE, LARGE VIEWING ANGLE, AND NO DISPLAY INVERSION | NO DISPLAY INVERSION |

LIQUID CRYSTAL DISPLAY DEVICE

CROSS-REFERENCE TO RELATED APPLICATIONS

This application is based upon and claims the benefit of priority Japanese Patent Application No. 2006-27542 filed Feb. 3, 2006; the entire contents of which are incorporated by reference.

BACKGROUND OF THE INVENTION

1. Field of the Invention

The present invention relates to a liquid crystal display device provided with transmissive regions for display with light of a backlight; and reflective regions for display with ambient light.

2. Description of the Related Art

Among liquid crystal display devices, there are several types of liquid crystal display devices. A type of liquid crystal display device is provided with reflective regions for display with ambient light, and another type thereof is provided with transmissive regions for display with light of a backlight. In addition, still another type of liquid crystal display device is disclosed in Japanese Patent Application Laid-open No. 2001-264750, and this liquid crystal display device is provided with both of reflective regions and transmissive regions.

In this liquid crystal display device, it is necessary to make a thickness of a liquid crystal layer in the reflective region thinner than a thickness of the liquid crystal layer in the transmissive region in order to regulate the phase differences in light passing through the liquid crystal layer. For this purpose, steps made of a transparent material are formed on any one of an array substrate and a counter substrate. In recent years, the development of liquid crystal display devices have been progressing in order to reduce costs and to reduce a time for a manufacturing process.

However, in a case where the steps are not provided to a liquid crystal display device according to a conventional technology, the device has a problem that a display quality level in the reflective region is degraded even though a display quality level in the transmissive regions is maintained

SUMMARY OF THE INVENTION

An object of the present invention is to achieve, in a liquid crystal display device, high display quality level both in the transmissive regions and in the reflective regions without providing steps in a liquid crystal layer.

A first characteristic of the present invention is that a liquid crystal display device includes an array substrate and a counter substrate which are arranged in a way that the two substrates face each other with a gap interposed therebetween; a liquid crystal layer formed between both of the substrates; a counter electrode on the counter substrate; transparent pixel electrodes formed in a matrix state on the array substrate; a metallic auxiliary capacitance line formed for each of the pixel electrode; a transmissive region for display with light having permeated each of the pixel electrodes; and a reflective region for display with light having been reflected from the auxiliary capacitance line, and in which a part of each of the pixel electrodes overlaps the auxiliary capacitance line.

In the present invention, images are displayed with light reflected from the metallic auxiliary capacitance line, and a part of each of the transparent pixel electrode overlaps the auxiliary capacitance line. An electric field generated between this pixel electrode and the counter electrode inclines liquid crystal molecules in the liquid crystal layer in a region where the pixel electrode and the auxiliary capacitance line overlap each other. Meanwhile, an oblique electric field generated between an end portion of this pixel electrode and the counter electrode inclines liquid crystal molecules in the liquid crystal layer in a region where the pixel electrode does not overlap the auxiliary capacitance line. Thereby, a phase difference in light passing through the reflective region is close to a phase difference in light passing through the transmissive region.

A second characteristic of the present invention is that, in the reflective region, an area of the auxiliary capacitance line where it overlaps the pixel electrode is substantially equal to an area of the auxiliary capacitance line where it does not overlap the pixel electrode.

A third characteristic of the present invention is that, in the reflective region, an area of the auxiliary capacitance line where it overlaps the pixel electrode is smaller than an area of the auxiliary capacitance line where it does not overlap the pixel electrode.

A fourth characteristic of the present invention is that the liquid crystal display device further includes, in the reflective region, a reflective electrode formed on the pixel electrode.

A fifth characteristic of the present invention is that a thickness of the transmissive region is substantially equal to a thickness of the reflective region.

A sixth characteristic of the present invention is that: an electric field generated between each of the pixel electrodes over the auxiliary capacitance line and the counter electrode inclines liquid crystal molecules in the region where the pixel electrode and the auxiliary capacitance line overlap each other; and an oblique electric field generated between an end portion of the pixel electrode and the counter electrode inclines liquid crystal molecules in the region where the pixel electrode does not overlap the metallic auxiliary capacitance line.

A seventh characteristic of the present invention is that: each of the liquid crystal molecules has negative dielectric anisotropy; the liquid crystal molecules are oriented substantially perpendicular to any one of the array substrate and the counter substrate in any one of a state where a voltage is not applied between the pixel electrode and the counter electrode and a state where a voltage less than a threshold value is applied therebetween; and the liquid crystal molecules are oriented obliquely or substantially parallel to any one of the array substrate and the counter substrate in a state where a voltage not less than the threshold value is applied between the pixel electrode and the counter electrode; and orientations in which these liquid crystal molecules are inclined are determined by directions of electric flux lines of electric fields generated in the liquid crystal layer.

DESCRIPTION OF THE EMBODIMENT

First Embodiment

Figure 1:
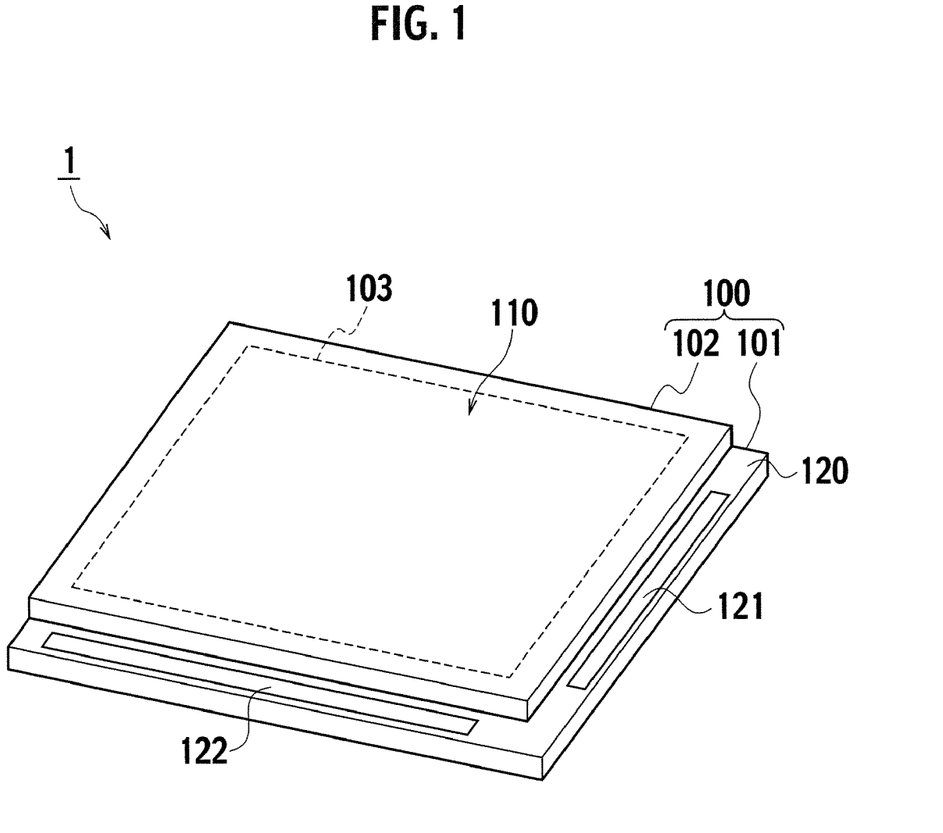
FIG. 1 is a schematic view of a liquid crystal display device of a first embodiment.

As shown in a schematic view of FIG. 1, a liquid crystal display device 1 of the present embodiment is provided with a liquid display panel 100 which includes an array substrate 101; a counter substrate 102 arranged facing the array substrate 101; and a liquid crystal layer 104 formed between the two substrates. A display region 110 in which an image is displayed is a region surrounded by a sealing member 103 formed so as to be used for sealing the two substrates.

Figure 2:
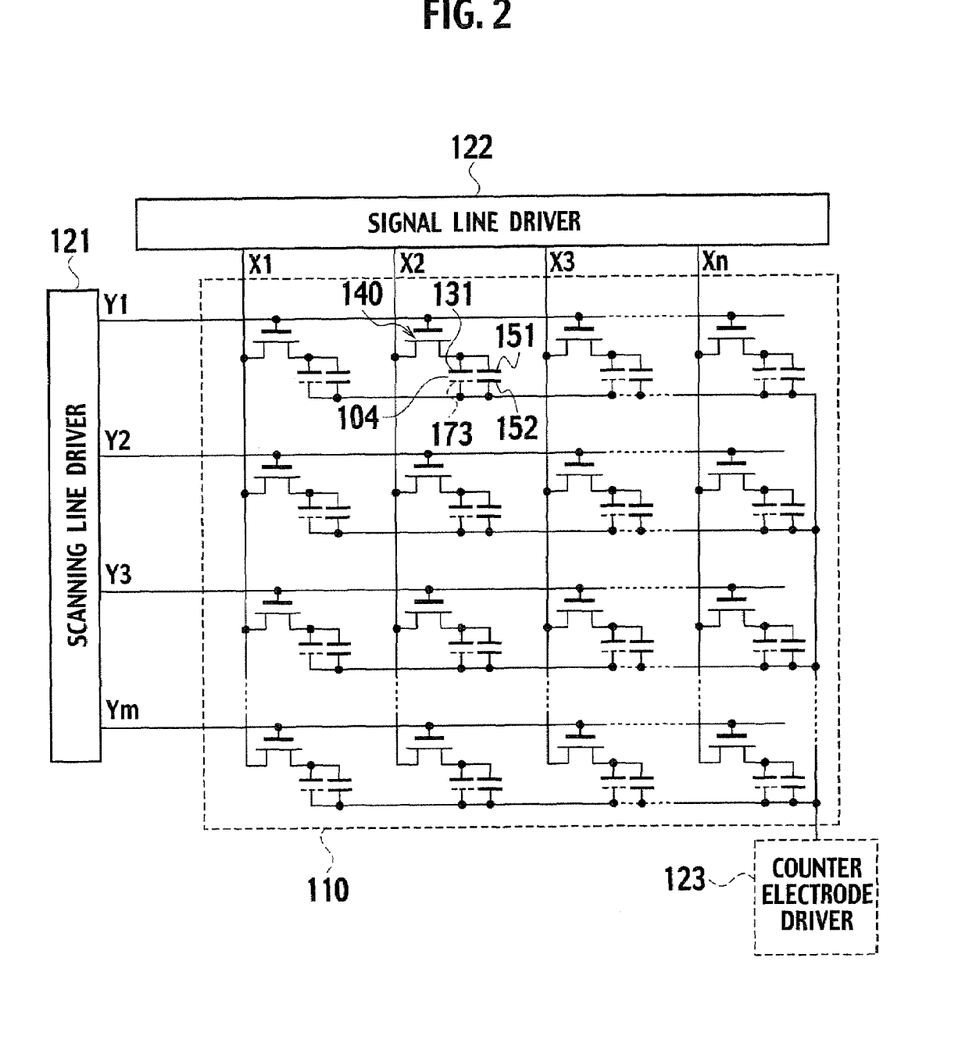
FIG. 2 is a circuit diagram of the liquid crystal display device of FIG. 1.

FIG. 2 is a circuit diagram of the liquid crystal display device in FIG. 1. As shown in FIG. 2, in the display region 110, m scanning lines Y1 to Ym wired parallel to one another, and n signal lines X1 to Xn wired parallel to one another, are wired in a way that the scanning lines Y1 to Ym intersect the signal lines X1 to Xn. In each of intersecting portions of the scanning lines Y1 to Ym and the signal lines X1 to Xn, there are arranged a pixel TFT 140; and an auxiliary capacitance formed of an auxiliary capacitance electrode 151 and an auxiliary capacitance line 152. Specifically, a drain terminal of the pixel TFT 140 is connected to the signal line X. A source terminal thereof is connected to the auxiliary capacitance electrode 151 and a pixel electrode 131. A gate terminal thereof is connected to the scanning line Y. Each of the m×n pixel electrodes 131 faces a counter electrode 173 with the liquid crystal layer 104 interposed in between. The counter electrode 173 is arranged on the counter substrate 102. Here, the pixel electrode 131 and the auxiliary capacitance electrode 151 are set at the same potential as that of each other.

In a region 120 surrounding the display region 110, a scanning line driver 121, a signal line driver 122 and a counter electrode driver 123 are arranged. The scanning line driver 121 drives the scanning lines Y1 to Ym. The signal line driver 122 drives the signal lines X1 to Xn. The counter electrode driver 123 is connected to the auxiliary capacitance line 152 and to the counter electrode 173, and is configured to control the auxiliary capacitance line 152 and the counter electrode 173 so that the potentials thereof can be respectively at predetermined values.

Figure 3:
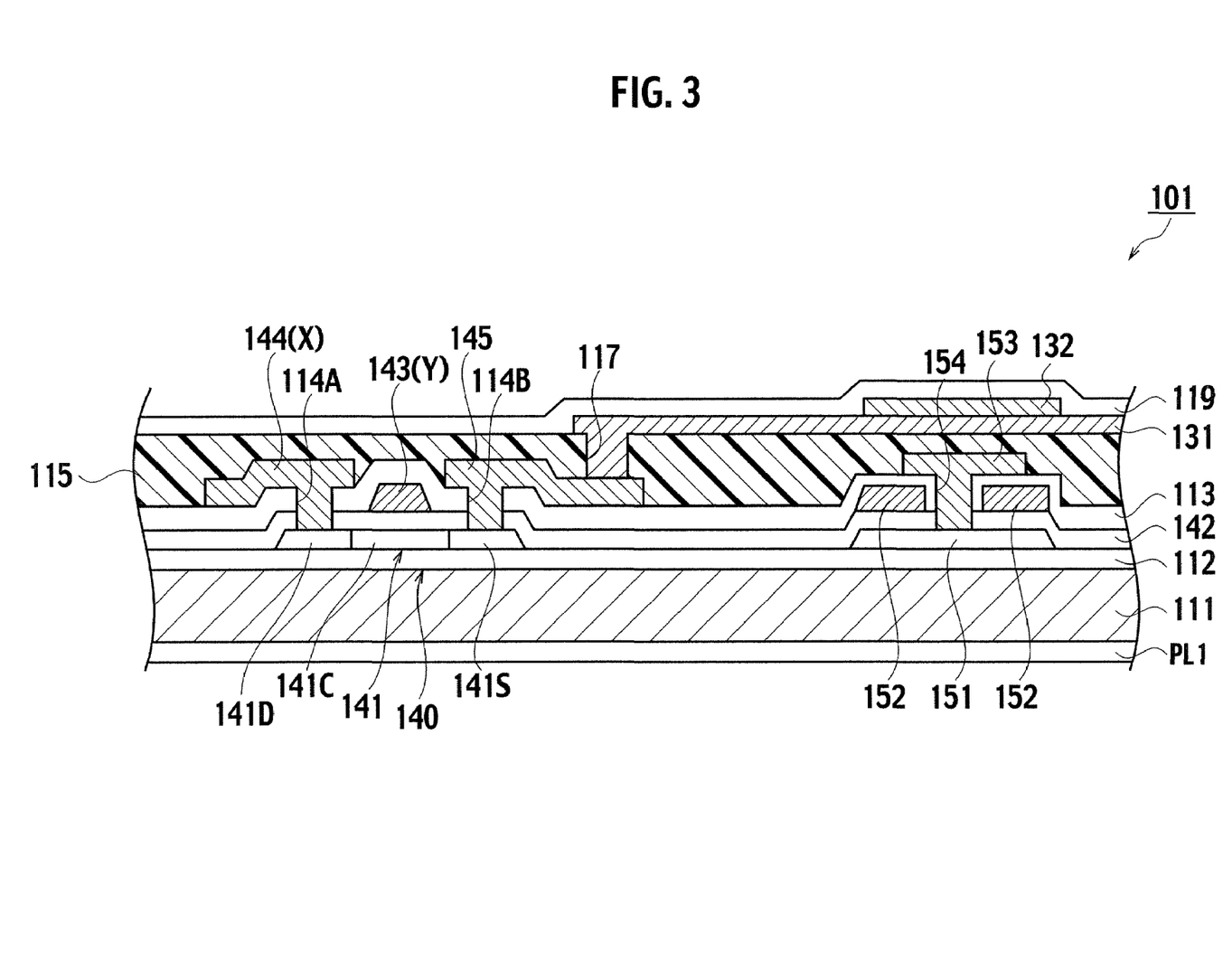
FIG. 3 is a cross-sectional view of a liquid crystal display panel of the liquid crystal display device of FIG. 1.

FIG. 3 is a cross-sectional view of the array substrate 101, and shows one of the intersecting portions of the scanning lines Y and the signal lines X. The array substrate 101 includes a transparent insulating substrate 111 such as a glass substrate; and a polarizing element PL1. The polarizing element PL1 is placed on a back surface of the array substrate 101, and is obtained by overlapping a phase difference plate and a polarizing plate with each other. An undercoat layer 112 is formed on the insulating substrate 111. The pixel TFT 140 is formed on the undercoat layer 112. This pixel TFT 140 is made of a semiconductor layer 141 formed of a polysilicon film on the undercoat layer 112. The semiconductor layer 141 is provided with a channel region 141C; and a drain region 141D and a source region 141S respectively doped with impurities. The drain region 141D and the source region 141S are placed respectively on both sides of the channel region 141C. The auxiliary capacitance electrode 151 is formed on the undercoat layer 112, and is made of a polysilicon film doped with an impurity.

A gate insulation film 142 is formed on each of the undercoat layer 112, the semiconductor layer 141 and the auxiliary capacitance electrode 151. The scanning line Y formed integrally with a gate electrode 143, and the auxiliary capacitance line 152 are formed on the gate insulation film 142. A part of the auxiliary capacitance line 152 faces the auxiliary capacitance electrode 151. The auxiliary capacitance line 152 is substantially parallel to the scanning line Y. A material for the auxiliary capacitance line 152 is the same material for the scanning line Y.

An interlayer dielectric film 113 is formed on each of the gate insulation film 142, the gate electrode 143, the scanning line Y and the auxiliary capacitance line 152. The signal line X formed integrally with a drain electrode 144, a source electrode 145 and a contact electrode 153 are formed on the interlayer dielectric 113. The signal line X is substantially perpendicular to the scanning line Y and for the auxiliary capacitance line 152. Molybdenum-tungsten, for example, is used as a material for the scanning line Y and for the auxiliary capacitance line 152. Aluminum, for example, is used as a material for the signal line X.

Contact holes 114A and 114B penetrate the gate insulation film 142 and the interlayer dielectric film 113. The drain electrode 144 is connected to the drain region 141D through the contact hole 114A. The source electrode 145 is connected to the source region 141S through the contact hole 114B.

A contact hole 154 penetrates the gate insulation film 142 and the interlayer dielectric film 113. The contact electrode 153 is connected to the auxiliary capacitance electrode 151 through the contact hole 154. The source electrode 145, the pixel electrode 131 and the auxiliary capacitance electrode 151 are made to have the same potential as that of one another because the contact electrode 153 is formed of the same material as the signal line X, and is connected to the signal line X.

A transparent resin layer 115 is formed on each of the interlayer dielectric film 113, the drain electrode 144, the source electrode 145, the scanning line Y, the signal line X and the contact electrode 153. The pixel electrode 131 is formed on the transparent resin layer 115. ITO (Indium Tin Oxide) is used for the pixel electrode 131.

Additionally, a reflective electrode 132 is formed on the pixel electrode 131 in a region over the auxiliary capacitance electrode 151. A metal such as aluminum, for example, is used for the reflective electrode 132. A potential of the reflective electrode 132 is made to be the same potential as that of the pixel electrode 131. A through hole 117 penetrates the transparent resin layer 115. The pixel electrode 131 and the reflective electrode 132 are connected to the source electrode 145 of the pixel TFT 140 through the through hole 117.

An orientation film 119 is formed on each of the transparent resin layer 115, the pixel electrode 131 and the reflective electrode 132. The orientation film 119 is for orienting liquid crystal molecules, which are contained in the liquid crystal layer 104, substantially perpendicular to the array substrate 101. Here, a thickness of the orientation film 119 is 100 nm.

Figure 4:
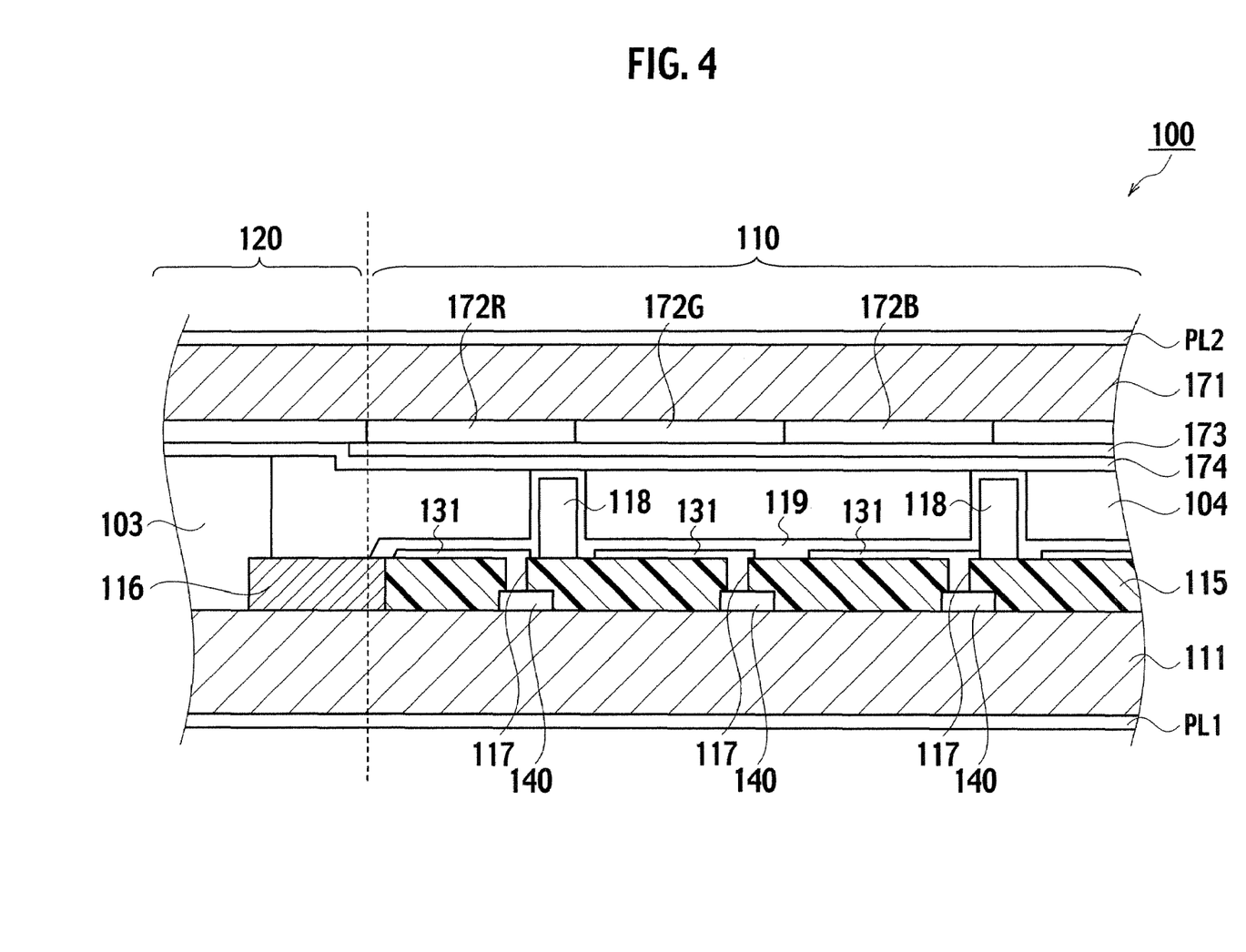
FIG. 4 is a cross-sectional view of an array substrate of the liquid crystal display device of FIG. 1.

FIG. 4 is a cross-sectional view of the liquid crystal display panel 100, and shows a vicinity of a border between the display region 110, and the region 120 which surrounds the display region 110. A polarizing element PL2 obtained by overlapping a phase difference plate and a polarizing plate with each other is provided to a front surface of the transparent insulating substrate 171. A red color filter layer 172R, a green color filter layer 172G and a blue color filter layer 172B are formed on the insulating substrate 171 in the display region 110. On the insulating substrate 171, the counter electrode 173 is formed so as to face all of the pixel electrodes 131. ITO (Indium Tin Oxide) is used for the counter electrode 173. An orientation film 174 is formed on the counter electrode 173. The orientation film 174 is for orienting the liquid crystal molecules, which are contained in the liquid crystal layer 104, substantially perpendicular to the counter substrate 101. Here, a thickness of the orientation film 174 is 100 nm.

Columnar spacers are provided to the liquid crystal layer 104. The height of each columnar spacer is, for example, 1.0 to 5.0 µm. The liquid crystal layer 104 is formed of the liquid crystal molecules having negative dielectric anisotropy. The liquid crystal molecules are oriented substantially perpendicular to the array substrate 101 or to the counter substrate 102 in a state where a voltage is not applied between the pixel electrode 131 and the counter electrode 173 or in a state where a voltage less than a threshold value is applied therebetween. The liquid crystal molecules are oriented obliquely or substantially parallel to the array substrate 101 or to the counter substrate 102 in a state where a voltage not less than the threshold value is applied between the pixel electrode 131 and the counter electrode 173. Orientations in which the liquid crystal molecules are inclined are determined by directions of electric flux lines of electric fields generated in the liquid crystal layer.

Otherwise, projections formed of an insulation film may be used as means which orients the liquid crystal molecules. This insulation film is, for example, an inorganic thin film made of a material such as $SiO_2$, SiNx, or an organic thin film made of a material such as polyimide, photoresist resin or polymer crystal. In a case where the insulation film is the inorganic thin film, the insulation film is formed by an evaporation method, a sputtering method, a CVD (Chemical Vapor Deposition) method, a solution application method, or the like. On the other hand, in a case where the insulation film is the organic thin film, the insulation film is formed, by use of a spinner application method, a screen-print application method or a roll application method, in a manner that a solution of an organic material or a solution of a precursor thereof is applied, and is then cured by a predetermined curing condition (heating, light irradiation or the like). Alternatively, the insulation film is formed by the evaporation method, the sputtering method, the CVD method, an LB (Langmuir-Blodgett) method or the like.

Figure 5A:
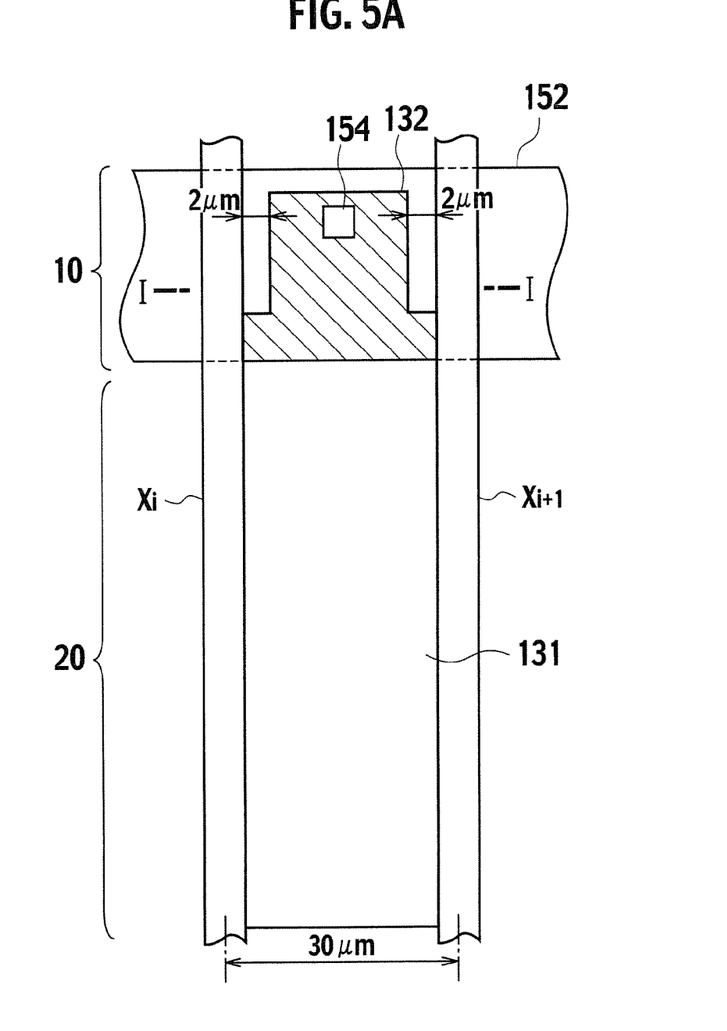
FIG. 5A is a plan view showing a configuration of one pixel on the array substrate.

FIG. 5A is a plan view for showing a configuration of one pixel on the array substrate. The signal lines $X_i$ and $X_{i+1}$, the pixel electrode 131, the metallic auxiliary capacitance line 152, the reflective electrode 132 and the contact hole 154 are provided on the array substrate. A pixel pitch is determined as a distance between the signal lines $X_i$ and $X_{i+1}$. The pixel pitch is, for example, 30 µm.

Images are displayed in a transmissive region 20 by utilizing light of a backlight which has permeated the pixel electrode 131. An insulating projection which determines a direction, in which the liquid crystal molecules are inclined, is provided to the counter substrate 102.

In a reflective region 10, a part of the pixel electrode 131 overlaps the auxiliary capacitance line 152. Furthermore, the reflective electrode 132 indicated by diagonal lines in FIG. 5A are formed on the pixel electrode 131. A potential of the reflective electrode 132 is made to be the same potential as that of the pixel electrode 131. Here, a width of the pixel electrode 131 in the reflective region 10 is narrower than a width of the pixel electrode 131 in the transmissive region 20, and distances from ends of the pixel electrode 131 to the respective signal lines $X_i$ and $X_{i+1}$ are each 2 µm. Images are displayed in this reflective region 10 by utilizing ambient light which has reflected from metal of the reflective electrode 132 and of the auxiliary capacitance line 152.

Steps made of a transparent material are not formed between the liquid crystal layers in the respective reflective region 10 and the transmissive region 20. Thereby, a thickness of the liquid crystal layer in the reflective region 10 and a thickness of the liquid crystal layer in the transmissive region 20 are substantially equal to each other.

Figure 5B:
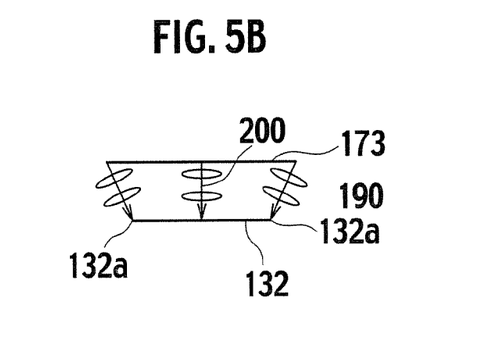
FIG. 5B is a cross-sectional view schematically showing a cross section taken along the I-I line of FIG. 5A.

FIG. 5B schematically shows a cross section taken along the I-I line in the reflective region 10 of FIG. 5A. FIG. 5B shows the alignment of the liquid crystal molecules. A voltage not less than the threshold value is applied between the pixel electrode 131 and the counter electrode 173.

In a region where the pixel electrode 131 and the auxiliary capacitance line 152 overlap each other, an electric field generated between the reflective electrode 132 on the pixel electrode 131 and the counter electrode 173 aligns the liquid crystal molecules 190. Here, because an electric flux line 200 is substantially perpendicular to the reflective electrode 132 and to the counter electrode 173, the liquid crystal molecules 190 are aligned substantially parallel to any one of the array substrate and the counter substrate.

On the other hand, in a region where the pixel electrode 131 does not overlap the auxiliary capacitance line 152, an electric field generated between each of end portions 132a of the reflective electrode 132 on the pixel electrode 131, and the counter electrode 173 aligns the liquid crystal molecules 190. Here, because the electric flux line 200 is oblique to the reflective electrode 132 and to the counter electrode 173, the liquid crystal molecules 190 are aligned obliquely to any one of the array substrate and the counter substrate.

Thus, the inclination of the liquid crystal molecules in the region where the pixel electrode 131 does not overlap the auxiliary capacitance line 152 differs from inclination of the liquid crystal molecules in the region where the pixel electrode 131 and the auxiliary capacitance line 152 overlap each other. Thereby, a phase difference of light passing through the reflective region 10 is close to a phase difference of light passing through the transmissive region 20.

Figure 6:
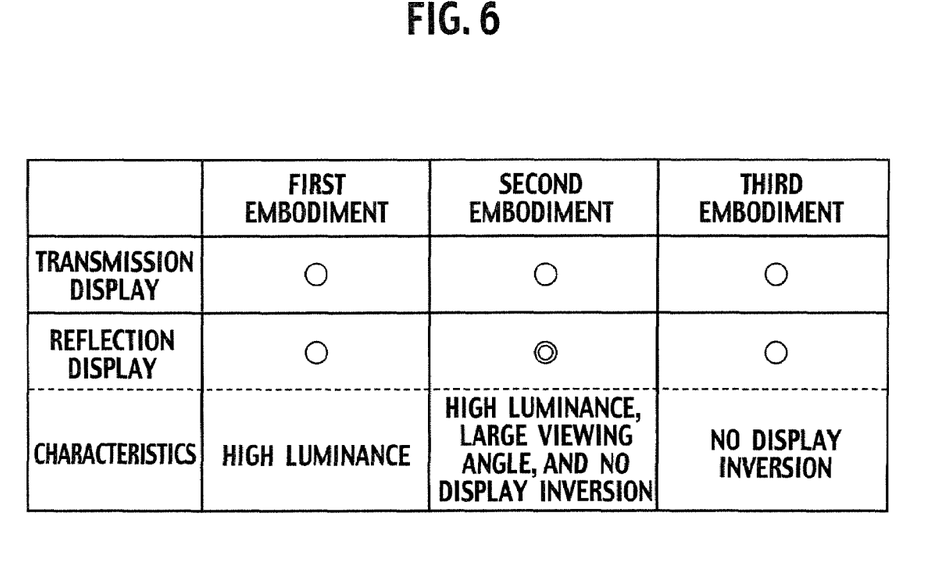
FIG. 6 is a table showing display quality level of liquid crystal display devices of the respective embodiments.

FIG. 6 is a table showing display quality levels of liquid crystal display devices of the respective embodiments. This table indicates that display quality levels in both of the transmissive region and in the reflective region are excellent in the liquid crystal display device of the first embodiment.

Figure 7:
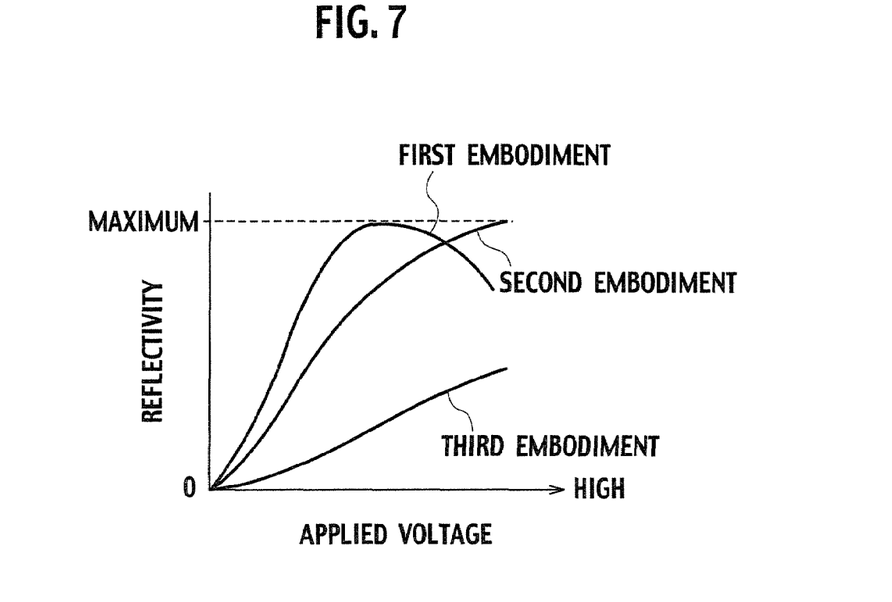
FIG. 7 is a chart showing reflective display characteristics of the liquid crystal display devices of the respective embodiments.

FIG. 7 is a chart showing reflective display characteristics of the liquid crystal display devices of the respective embodiments. As shown in FIG. 7, in a case where an applied voltage is high in the liquid crystal display device of the first embodiment, a reflectivity is also high. Accordingly, a luminance is high in the reflective region.

Hence, in the liquid crystal display device of the first embodiment, high display quality level can be achieved in both of the transmissive region 20 and the reflective region 10 without providing steps in the liquid crystal layer.

DESCRIPTION OF THE EMBODIMENT

Second Embodiment

A basic configuration of a liquid crystal display device in the second embodiment is the same as the configuration having been described in the first embodiment. A difference thereof with the first embodiment is that, in the reflective region 20, an area of the auxiliary capacitance line 152 where it overlaps the pixel electrode 131 is substantially equal to an area of the auxiliary capacitance line 152 where it does not overlap the pixel electrode 131.

Figure 8A:
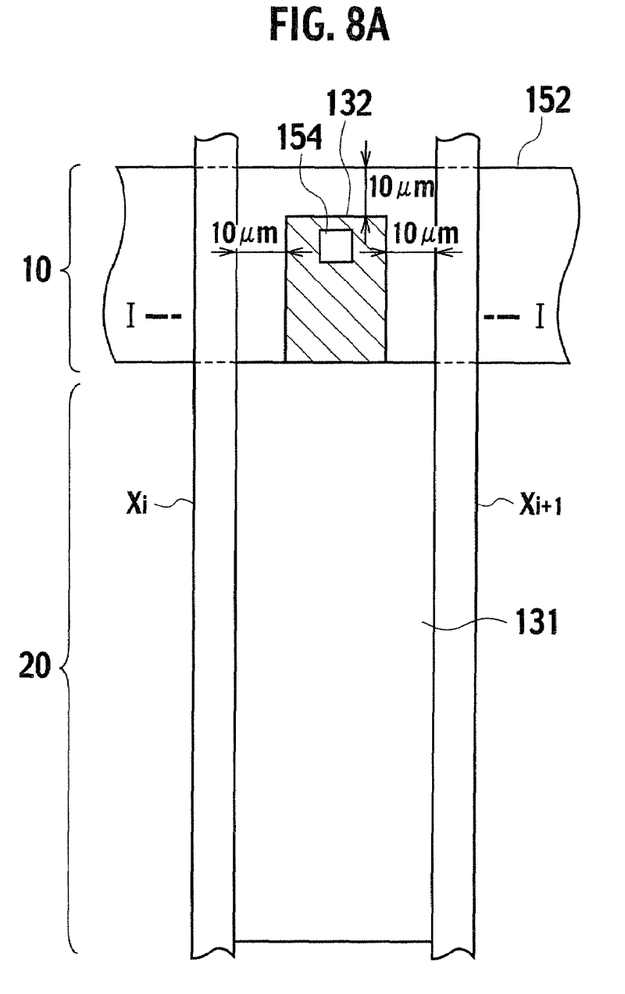
FIG. 8A is a plan view showing a configuration of one pixel of a liquid crystal display device of a second embodiment.

FIG. 8A shows a configuration of one pixel of the liquid crystal display device of the second embodiment. In the reflective region 10, a width of the pixel electrode 131 over the auxiliary capacitance line 152 is made still narrower than that of the first embodiment, and the reflective electrode 132 is formed on the pixel electrode 131. An area of the reflective electrode 132 indicated by diagonal lines in FIG. 8A is substantially equal to an area of the auxiliary capacitance line 152 where it does not overlap the reflective electrode 132. Here, distances from ends of the respective pixel electrode 131 and of the reflective electrode 132 to the respective signal lines $X_i$ and $X_{i+1}$ and an end to the auxiliary capacitance line 152 are each 10 μm.

Figure 8B:
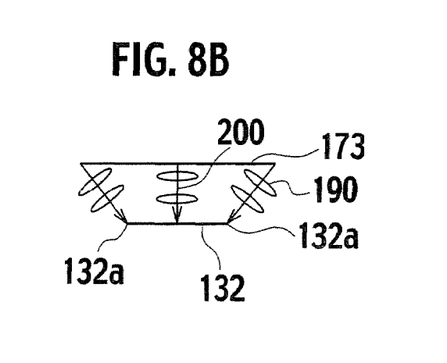
FIG. 8B is a cross-sectional view schematically showing a cross section taken along the I-I line of FIG. 8A.

FIG. 8B is a cross-sectional view schematically showing a cross section taken along the I-I line of FIG. 8A. In a region where the pixel electrode 131 does not overlap the auxiliary capacitance line 152, an oblique electric field between each of the end portions 132a of the pixel electrode 132 and the counter electrode obliquely aligns the liquid crystal molecules 190. Angles of the liquid crystal molecules are made larger than angles of the liquid crystal molecules in the first embodiment. Thereby, a viewing angle in reflective display is made still larger in the liquid crystal display device of the second embodiment than that of the first embodiment.

The table in FIG. 6 indicates that display quality level in the liquid crystal display device of the second embodiment is superior to those in the liquid crystal display device of the first embodiment.

As shown in the chart in FIG. 7, in the liquid crystal display device of the second embodiment, a high luminance can be obtained in the reflective region because a reflectivity is higher as an applied voltage is higher. In addition, even when the applied voltage is high, the reflectivity does not decrease. Thus, display inversion does not occur.

DESCRIPTION OF THE EMBODIMENT

Third Embodiment

A basic configuration of a liquid crystal display device in the third embodiment is the same as the configuration having been described in the second embodiment. A difference thereof with the second embodiment is that, in the reflective region 20, an area of the auxiliary capacitance line 152 where it overlaps the pixel electrode 131 is smaller than an area of the auxiliary capacitance line 152 where it does not overlap the pixel electrode 131.

Figure 9:
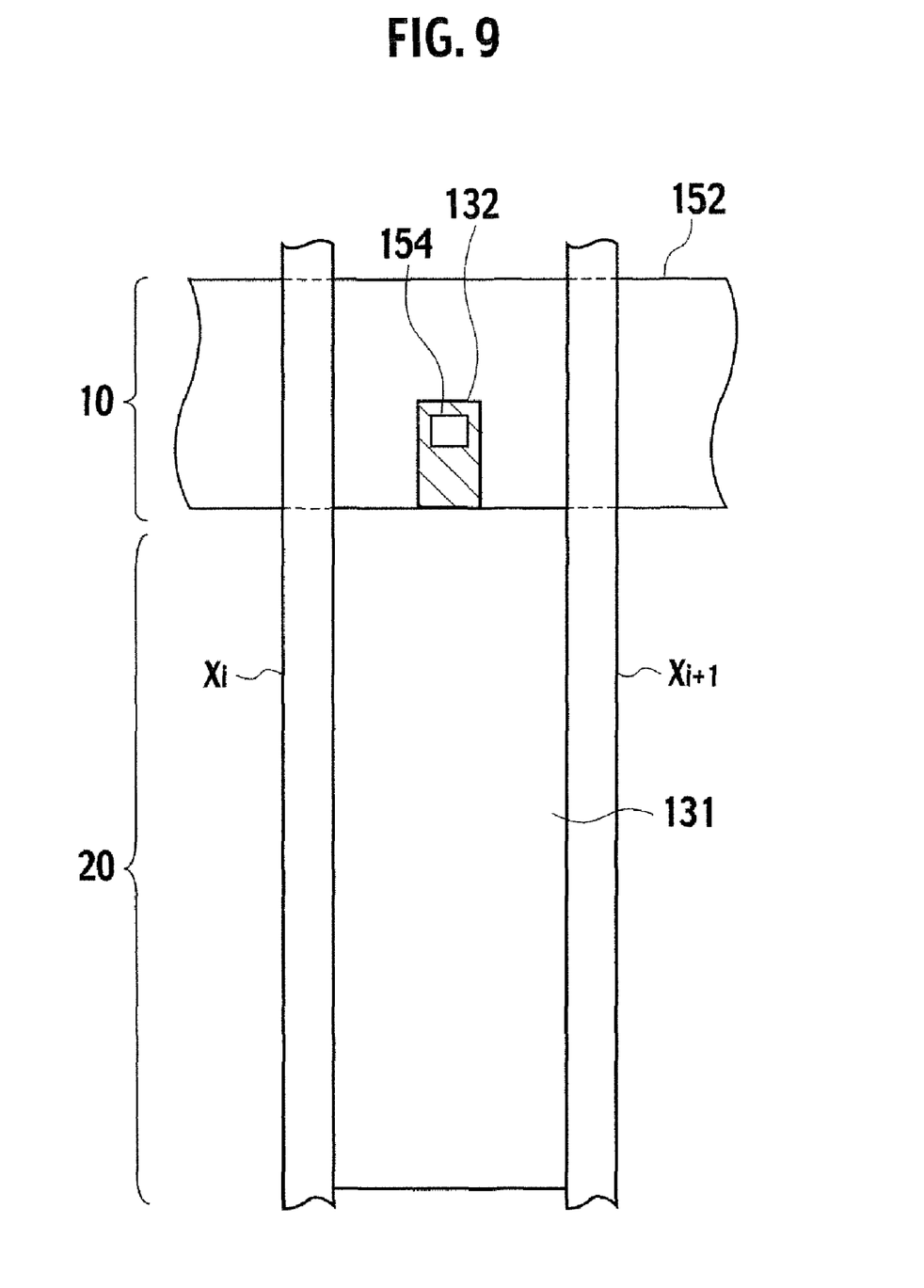
FIG. 9 is a plan view showing a configuration of one pixel of a liquid crystal display device of a third embodiment.

FIG. 9 shows a configuration of one pixel of the liquid crystal display device in the third embodiment. The reflective electrode 132 is formed on the pixel electrode 131. An area of the reflective electrode 132 indicated by diagonal lines in FIG. 9 is smaller than an area of the auxiliary capacitance line 152 where it does not overlap the reflective electrode 132. Here, distances from ends of the respective pixel electrode 131 and of the reflective electrode 132 to the respective signal lines $X_i$ and $X_{i+1}$ are each 10 μm, and a distance to an end to the auxiliary capacitance line 152 from a corresponding end thereof is 20 μm.

The table in FIG. 6 indicates that display quality level in both of the transmissive region and the reflective region are excellent in the liquid crystal display device of the third embodiment.

As shown in the chart in FIG. 7, as an applied voltage in the liquid crystal display device of the third embodiment is higher, a reflectivity is made higher until it reaches a certain value. Even when the applied voltage is high, the reflectivity does not decrease. Thus, display inversion does not occur.

Incidentally, in each of the liquid crystal display devices in the respective embodiments, the reflective electrode 132 is formed on the pixel electrode 131 in the reflective region 10. This configuration facilitates regulation of a reflectivity, and makes it easier to obtain a desired reflectivity. Additionally, in a case where the desired reflectivity has been already obtained in the reflective region 10, the reflective electrode 132 is not necessary. In each of the liquid crystal display devices in the respective embodiments, excellent display quality level can be obtained in both of the transmissive region and the reflective region.

DESCRIPTION OF THE EMBODIMENT

Fourth Embodiment

A basic configuration of a liquid crystal display device in the fourth embodiment is the same as the configurations having been described in the respective embodiments.

Figure 10:
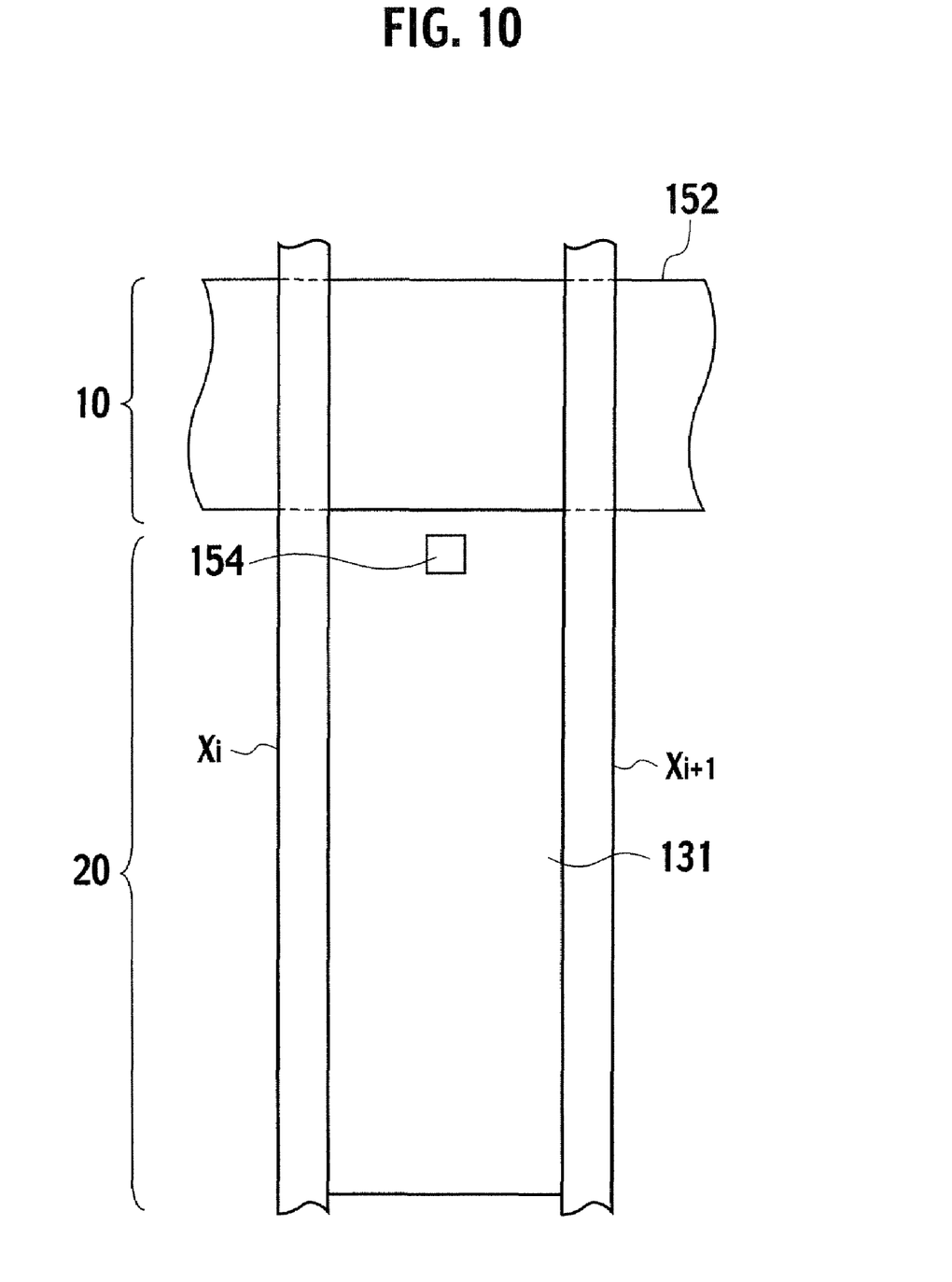
FIG. 10 is a plan view showing a configuration of one pixel of a liquid crystal display device of a fourth embodiment.

In each of the respective embodiments, a part of the pixel electrode 131 overlaps the auxiliary capacitance line 152. On the other hand, in a case where the pixel electrode 131 and the auxiliary capacitance line 152 are formed apart from each other, an electric field intensity in the reflective region 10 decreases. Consequently, in the liquid crystal display device in the present embodiment, the pixel electrode 131 does not overlap the auxiliary capacitance line 152, but is adjacent thereto in the reflective region 10. Thereby, sufficient electric field intensity can be obtained.

What is claimed is:

1. A liquid crystal display device comprising:
   an array substrate and a counter substrate which are arranged in a way that the two substrates face each other with a gap interposed therebetween;
   a liquid crystal layer formed between the two substrates;
   a counter electrode placed on the counter substrate;
   transparent pixel electrodes formed in a matrix state on the array substrate;
   metallic auxiliary capacitance lines each formed for each of the pixel electrodes;
   transmissive regions each for display with light having permeated each of the pixel electrodes; and
   reflective regions each of which is used for display with light having been reflected from the auxiliary capacitance line, in each of which a part of the pixel electrode overlaps the auxiliary capacitance line.

2. The liquid crystal display device according to claim 1, wherein, in each of the reflective regions, an area of the auxiliary capacitance line where it overlaps the pixel electrode is substantially equal to an area of the auxiliary capacitance line where it does not overlap the pixel electrode.

3. The liquid crystal display device according to claim 1, wherein, in each of the reflective regions, an area of the auxiliary capacitance line where it overlaps the pixel electrode is smaller than an area of the auxiliary capacitance line where it does not overlap the pixel electrode.

4. The liquid crystal display device according to claim 1, further comprising reflective electrodes, each of which is formed on the pixel electrode in each of the reflective regions.

5. The liquid crystal display device according to claim 1, wherein a thickness of the transmissive region is substantially equal to a thickness of the reflective region.

6. The liquid crystal display device according to claim 1, wherein
an electric field generated between the pixel electrode over the auxiliary capacitance line, and the counter electrode inclines liquid crystal molecules in a region where the pixel electrode overlaps the auxiliary capacitance line, and
an oblique electric field generated between an end portion of the pixel electrode and the counter electrode inclines liquid crystal molecules in a region where the pixel electrode does not overlap the auxiliary capacitance line.

7. The liquid crystal display device according to claim 6, wherein
each of the liquid crystal molecules has negative dielectric anisotropy,
the liquid crystal molecules are oriented substantially perpendicular to any one of the array substrate and the counter substrate in any one of a state where a voltage is not applied between the pixel electrode and the counter electrode and a state where a voltage less than a threshold value is applied therebetween;
the liquid crystal molecules are oriented obliquely or substantially parallel to any one of the array substrate and the counter substrate in a state where a voltage not less than the threshold value is applied between the pixel electrode and the counter electrode; and
orientations in which the liquid crystal molecules are inclined are determined by directions of electric flux lines of electric fields.

8. A liquid crystal display device comprising:
an array substrate and a counter substrate which are arranged in a way that the two substrates face each other with a gap interposed therebetween;
a liquid crystal layer formed between the two substrates;
a counter electrode placed on the counter substrate;
transparent pixel electrodes formed in a matrix state on the array substrate;
metallic auxiliary capacitance lines each formed for each of the pixel electrodes;
transmissive regions for display with light having permeated each of the pixel electrodes; and
reflective regions for display with light having been reflected on the auxiliary capacitance line in each of which: a part of each of the pixel electrodes overlaps the auxiliary capacitance line; a reflective electrode is formed on that pixel electrode; and an area of the auxiliary capacitance line where it overlaps the pixel electrode is substantially equal to an area of the auxiliary capacitance line where it does not overlap the pixel electrode,
the liquid crystal display device wherein
a thickness of the transmissive region is substantially equal to a thickness of the liquid crystal layer in the reflective region;
an electric field generated between the pixel electrode over the auxiliary capacitance line and the counter electrode inclines liquid crystal molecules in the liquid crystal layer in a region where the pixel electrode overlaps the auxiliary capacitance line, and an oblique electric field generated between an end portion of that pixel electrode and the counter electrode inclines liquid crystal molecules in the liquid crystal layer in a region where the pixel electrode does not overlap the auxiliary capacitance line;
the liquid crystal molecules each having negative dielectric anisotropy are oriented substantially perpendicular to any one of the array substrate and the counter substrate in any one of a state where a voltage is not applied between the pixel electrode and the counter electrode and a state where a voltage less than a threshold value is applied therebetween, and are oriented obliquely or substantially parallel to any one of the array substrate and the counter substrate in a state where a voltage not less than the threshold value is applied between the pixel electrode and the counter electrode; and
orientations in which these liquid crystal molecules are inclined are determined by directions of electric flux lines of electric fields.

9. A liquid crystal display device comprising:
an array substrate and a counter substrate which are arranged in a way that the two substrates face each other with a gap interposed therebetween;
a liquid crystal layer formed between the two substrates;
a counter electrode placed on the counter substrate;
transparent pixel electrodes formed in a matrix state on the array substrate;
metallic auxiliary capacitance lines each formed for each of the pixel electrode;
transmissive regions each for display with light having permeated each of the pixel electrodes; and
reflective regions each of which is used for display with light having been reflected from the auxiliary capacitance line, and in which the pixel electrode does not overlap the auxiliary capacitance line, but is adjacent thereto.

* * * * *